US010929535B2

(12) United States Patent
Sukhomlinov et al.

(10) Patent No.: US 10,929,535 B2
(45) Date of Patent: Feb. 23, 2021

(54) CONTROLLED INTRODUCTION OF UNCERTAINTY IN SYSTEM OPERATING PARAMETERS

(71) Applicant: Intel Corporation, Santa Clara, CA (US)

(72) Inventors: Vadim Sukhomlinov, Santa Clara, CA (US); Kshitij Doshi, Tempe, AZ (US); Francesc Guim, Barcelona (ES); Alex Nayshtut, Gan Yavne (IL)

(73) Assignee: Intel Corporation, Santa Clara, CA (US)

( * ) Notice: Subject to any disclaimer, the term of this patent is extended or adjusted under 35 U.S.C. 154(b) by 264 days.

(21) Appl. No.: 16/023,160

(22) Filed: Jun. 29, 2018

(65) Prior Publication Data

US 2019/0042747 A1 Feb. 7, 2019

(51) Int. Cl.
*G06F 21/75* (2013.01)
*G06F 21/56* (2013.01)
(Continued)

(52) U.S. Cl.
CPC .......... *G06F 21/566* (2013.01); *G06F 21/554* (2013.01); *G06F 21/556* (2013.01);
(Continued)

(58) Field of Classification Search
CPC ......... H04L 9/001; H04L 9/002; H04L 9/004; H04L 9/005; H04L 2209/08;
(Continued)

(56) References Cited

U.S. PATENT DOCUMENTS 5,774,710 A * 6/1998 Chung .................. G06F 9/3806
712/23
6,341,357 B1 * 1/2002 Ravichandran ..... G06F 11/3466
714/38.1

(Continued)

OTHER PUBLICATIONS

Microsoft Edge Team, "Mitigating speculative execution side-channel attacks in Microsoft Edge and Internet Explorer," Jan. 2018. [Online].obtained from <https://blogs.windows.com/msedgedev/2018/01/03/speculative-execution-mitigations-microsoft-edge-internet-explorer/>, Retrieved on May 7, 2020.*

(Continued)

*Primary Examiner* — Jason K Gee
*Assistant Examiner* — Zhimei Zhu
(74) *Attorney, Agent, or Firm* — Alliance IP, LLC

(57) ABSTRACT

The present disclosure is directed to systems and methods for mitigating or eliminating the effectiveness of a side channel attack, such as a Meltdown or Spectre type attack by selectively introducing a variable, but controlled, quantity of uncertainty into the externally accessible system parameters visible and useful to the attacker. The systems and methods described herein provide perturbation circuitry that includes perturbation selector circuitry and perturbation block circuitry. The perturbation selector circuitry detects a potential attack by monitoring the performance/timing data generated by the processor. Upon detecting an attack, the perturbation selector circuitry determines a variable quantity of uncertainty to introduce to the externally accessible system data. The perturbation block circuitry adds the determined uncertainty into the externally accessible system data. The added uncertainty may be based on the frequency or interval of the event occurrences indicative of an attack.

29 Claims, 5 Drawing Sheets

(51) Int. Cl.
*G06F 21/62* (2013.01)
*G06F 21/55* (2013.01)
*H04L 9/00* (2006.01)

(52) U.S. Cl.
CPC .......... *G06F 21/6218* (2013.01); *H04L 9/005* (2013.01); *G06F 21/55* (2013.01); *G06F 2207/7223* (2013.01); *G06F 2221/034* (2013.01); *H04L 2209/046* (2013.01); *H04L 2209/08* (2013.01)

(58) Field of Classification Search
CPC .. G06F 21/556; G06F 21/554; G06F 21/6218; G06F 2221/034
See application file for complete search history.

(56) References Cited

U.S. PATENT DOCUMENTS

| | | | | |
|---|---|---|---|---|
| 8,813,240 | B1* | 8/2014 | Northup | G06F 21/554 |
| | | | | 726/22 |
| 8,996,814 | B2* | 3/2015 | Peinado | G06F 12/126 |
| | | | | 711/133 |
| 9,015,838 | B1* | 4/2015 | Northup | H04L 9/005 |
| | | | | 713/188 |
| 9,378,363 | B1* | 6/2016 | Patel | G06F 21/55 |
| 9,405,708 | B1* | 8/2016 | Pohlack | G06F 21/54 |
| 9,436,603 | B1* | 9/2016 | Pohlack | G06F 21/556 |
| 9,438,624 | B2* | 9/2016 | Fine | H04L 63/1416 |
| 9,754,103 | B1* | 9/2017 | Patel | G06F 21/52 |
| 9,846,587 | B1* | 12/2017 | Schumacher | G06F 11/3457 |
| 2002/0147932 | A1* | 10/2002 | Brock | G06F 1/3203 |
| | | | | 713/300 |
| 2011/0063093 | A1* | 3/2011 | Fung | G06Q 10/0875 |
| | | | | 340/10.52 |
| 2014/0123139 | A1* | 5/2014 | Fine | G06F 9/45558 |
| | | | | 718/1 |
| 2014/0259161 | A1* | 9/2014 | Kastner | G06F 21/556 |
| | | | | 726/22 |
| 2015/0082434 | A1* | 3/2015 | Sethumadhavan | H04L 9/005 |
| | | | | 726/23 |
| 2016/0026801 | A1* | 1/2016 | Kastner | G06F 21/60 |
| | | | | 726/26 |
| 2016/0285896 | A1* | 9/2016 | Caprioli | G06F 21/72 |
| 2017/0286421 | A1* | 10/2017 | Hayenga | G06F 9/3806 |
| 2018/0262230 | A1* | 9/2018 | Jain | H04L 9/0838 |
| 2018/0262526 | A1* | 9/2018 | Jain | G09C 1/00 |
| 2019/0020658 | A1* | 1/2019 | Racz | G08B 13/196 |
| 2019/0130104 | A1* | 5/2019 | Carlson | G06F 12/0802 |
| 2019/0163902 | A1* | 5/2019 | Reid | G06F 21/53 |
| 2019/0166158 | A1* | 5/2019 | Grocutt | G06F 9/3861 |
| 2019/0204390 | A1* | 7/2019 | Krishnamoorthi | G01R 31/343 |
| 2019/0272239 | A1* | 9/2019 | Hagersten | G06F 12/1475 |
| 2019/0303161 | A1* | 10/2019 | Nassi | G06F 9/3844 |
| 2019/0325132 | A1* | 10/2019 | Manthos | G06F 21/52 |
| 2019/0327075 | A1* | 10/2019 | Weber | H04L 9/005 |
| 2019/0327076 | A1* | 10/2019 | Weber | H04L 9/005 |
| 2020/0004543 | A1* | 1/2020 | Kumar | G06F 9/3804 |

OTHER PUBLICATIONS

Lipp, Moritz et. al., Meltdown, 27th {USENIX} Security Symposium ({USENIX} Security 18), 2018, 16 pages.
Kocher, Paul, et al., Spectre Attacks: Exploiting Speculative Execution, 40th IEEE Symposium on Security and Privacy (S&P'19)2018, 19 pages.

* cited by examiner

CONTROLLED INTRODUCTION OF UNCERTAINTY IN SYSTEM OPERATING PARAMETERS

TECHNICAL FIELD

The present disclosure relates to computer security, specifically detection and/or prevention of side-channel attacks.

BACKGROUND

Side-channel attacks gained widespread notoriety in early 2018. A side-channel attack includes any attack based on information gained from the implementation of a computer system, rather than weaknesses in the implemented algorithm itself. Such side-channel attacks may use timing information, power consumption, electromagnetic leaks or even sound as an extra source of information, that is exploited to obtain information and/or data from the system. Side-channel attacks include Spectre and Meltdown, both of which rely on deducing whether data originates in a cached or un-cached location. To a significant degree, the determination of where data originates relies upon the precise timing of events such as loads from memory space.

Modern operating systems map the kernel into the address space of every process executed by the processor. Access to the kernel space is restricted using a supervisor bit of the processor that is set to permit kernel access to the kernel space and is reset to block or prohibit user access to the kernel space. Meltdown overcomes this memory isolation, thereby permitting the user process to read the entire kernel memory of the machine executing the user process.

Meltdown relies upon out-of-order execution to obtain data from the kernel space. CPUs supporting out-of-order execution support running operations speculatively to the extent that processor's out-of-order logic processes instructions before the CPU is certain whether the instruction is valid and committed. Meltdown reads information from the protected kernel space by causing the processor to execute multiple instructions such as:

```
data=getByte(kernelAddress)
variable=probeArray(data)
```

The "getByte" instruction will ultimately fail because of the prohibited read of kernel memory. However, the simultaneous access of an element in "probeArray" will pull the data from "probeArray" into cache. By timing reads at addresses from 0 to 255 in cache, the attacker is able to deduce the content of "kernelAddress."

For example, after flushing the cache, the Meltdown attacker retrieves a value "01000000" (binary "64") from a first address in the kernel memory. Prior to the processor generating an exception to the unauthorized read from kernel memory, the attacker uses retrieved kernel data as an index to access element "64" in a known array located in user space. The processor retrieves the value of array element 64 and loads the value into cache. The attacker then attempts to read every element from the array—access times for elements 0-63 and 65-255 will be relatively long as the data is retrieved from main memory. However the access time for element 64 will be considerably shorter as the data need only be retrieved from the cache. From this the attacker can deduce the data the first address in kernel memory is "0100000". By performing the action for every location in kernel memory, the attacker is able to read the contents of the kernel memory.

A first class of Spectre attacks takes advantage of branch target misprediction by a CPU to read data from memory into cache. Upon detecting the misprediction, the CPU clears the data from the pipeline, but the data read into cache remains. A covert side-channel may then be used to obtain the residual data from the cache. In this class of attack, the attacker trains the branch predictor in a system to take a particular branch. For example, using the following instructions, an attacker may train the system by providing values for "x" that are consistently smaller than the size of "array1." The attacker thus trains the system to speculatively execute the subsequent instruction based on the assumption that the branch has been historically true:

```
if ( x < array1.size( )) {
    int value = array2[array1[x] * 256] // branch 1
}
```

After training the system, the attacker sets the cache to a known state and provides a value of "x" that exceeds the size of "array1." Having been previously trained that "x" is typically less than the size of "array1," the processor executes the branch instruction (prior to the processor throwing the exception due to "x" being greater than the size of "array1") and uses the value found at address "x" as an index to look up the value at address "x" in array2. The processor loads the value at address "x" in array2 into cache. The attacker then reads all of the values of array2 and is able to determine the value of "x" as the address in array2 having the shortest access time.

For example, assume array1 has 256 elements addressed "0" to "255." The attacker provides values of "x" between 0 and 255 to train the system that the branch instruction is routinely executed. The attacker then sets the cache to a known state and provides a value of 512 for "x" (i.e., a value greater than 255). The value "01000000" (i.e., "64") at memory location 512 is read. The processor then looks up the value of array2 at address 64*256 and loads the value into cache. The attacker then examines the read time for each element in array2, the read time for element at address 64*256 will be less than the read time for the other array2 addresses, providing the attacker the information that the address at memory location 512 is "01000000" or "64." By performing the action for every memory location, the attacker is able to read the contents of the memory byte-by-byte.

A second class of Spectre attacks exploits indirect branching by poisoning the Branch Target Buffer (BTB) such that a CPU speculatively executes a gadget that causes the CPU to read data from memory into cache. Upon detecting the incorrect branching, the CPU clears the data from the pipeline but, once again, the data read into cache remains. A covert side-channel may then be used to obtain the residual data from the cache. In this class of attack, the attacker poisons the BTB of the victim system by repeatedly performing indirect branches to a virtual address in the victim's system that contains the gadget. For example, an attacker may control the content of two registers (R1, R2) in the victim's system at the time an indirect branch occurs. The attacker must find a gadget in the victim's system that, upon speculative execution by the victim's CPU, leaks data from selected memory locations in the victim's system. The gadget may be formed by two instructions, the first of which contains an instruction that mathematically and/or logically (add, subtract, XOR, etc.) combines the contents of register R1 with another register in the victim's system and stores the result in R2. The second instruction reads the contents of register R2, storing the value in R2 in cache.

For example, the attacker may control two registers in the victim system, ebx (R1) and eth (R2). The attacker then finds two instructions on the victim's system, such as:

```
adc    edi,dword ptr [ebx+edx+13BE13BDh]
adc    dl,byte ptr [edi]
```

By selecting ebx=0x13BE13BD−edx the attacker is able to read the victim's memory at address "m." The result is then added to the value in edi (R2). The second instruction in the gadget causes a read of R2 which contains the sum of "in" plus the attacker's value initially loaded into edi, transferring the value into the cache. By detecting the location of R2 within the cache using a side-channel timing attack, the attacker is able to determine the value of "m."

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
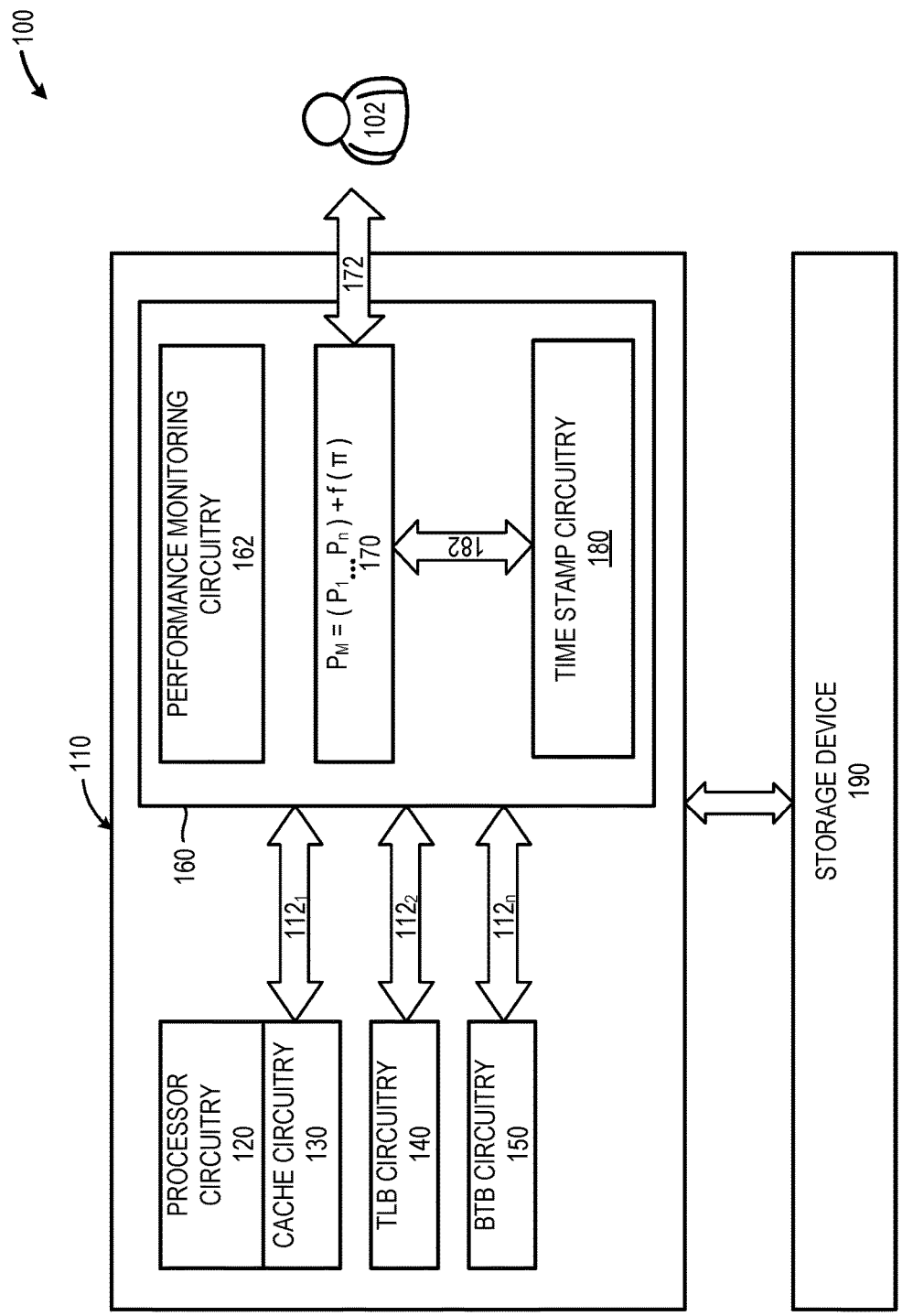
FIG. 1 provides a high level block diagram of an illustrative system that includes a central processing unit (CPU) that provides performance and/or timing data to a coupled performance management unit (PMU) having perturbation circuitry to introduce a variable level of uncertainty into performance data accessible by an external entity, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

Speculative execution beneficially increases the speed of a system by allowing the processor to execute instructions independent of data and/or input/output (I/O) access. With speculative execution, a high percentage of the executed instructions will be needed by an application executed by the processor. Upon successful execution and integration of the result of the instruction into the application flow, the processor then "retires" the instruction. The small portion of speculatively executed instructions that do not complete successfully and/or are not integrated into the application flow are not retired by the processor and thus remain in an "unretired" state.

Speculatively executed instructions may cause a change in cache state (i.e., may cause a cache write operation as a result of a data move or similar instruction) regardless of whether the instruction completes successfully and is "retired" or fails to complete successfully and remains "unretired." It is the existence of this vestigial data in the cache that serves as the target for side-channel attacks such as Spectre and Meltdown. During a Spectre or Meltdown attack, the processor executes one or more impermissible instructions that ultimately cause an exception—ordinarily, such instructions may cause a data transfer to the cache, however the instruction itself would remain "unretired" and the process flow proceeds without incident. However, Spectre and Meltdown take advantage of the data transferred to the cache during the pendency of the instruction execution (i.e., before the processor is able to generate an exception). By determining the location of the data transferred into cache, Spectre and Meltdown are able to infer information about the data itself. When performed repeatedly, Spectre and Meltdown are able to read large portions of system memory, including reserved and/or protected memory space that may contain secrets such as passwords, account information, and similar.

Thus, timing based side-channel attacks take advantage of the relatively shorter time required to access data stored in the cache (e.g., 10's of nanoseconds) as compared to the relatively longer time required to access data in main memory (e.g., 100's of nanoseconds). Such attacks depend upon placing the cache in a known state as to not "pollute" the cache with data transfers by other applications. Thus, a typical timing based side-channel attack may perform a number of cache line flush (CLFLUSH) operations, each preceding a transfer of data to the cache prior to determining (by inference) the surreptitiously obtained data based on reduced cache access times. The dependency of such attacks on accurate access time information and the repeated instructions such as CLFLUSH expose vulnerabilities in such timing based side-channel attacks.

The systems and methods disclosed herein beneficially and advantageously increase the uncertainty in system parameters (e.g., cache timing information) to an extent that renders ineffective timing based side-channel attacks such as Spectre and Meltdown. Processor-based systems contain system performance monitoring circuitry that sample and/or monitor various processor and system operating parameters such as: processor cache performance (hits, misses, writebacks, etc.); branch target buffer (BTB) performance (hits, misses, etc.); translation lookaside buffer (TLB) performance (misses, invalidations, etc.); and/or time stamp counter usage. The systems and methods described herein provide additional circuitry to the performance monitoring circuitry to detect changes and/or patterns in the interval between and/or frequency of attempts to read processor and system operating parameters that may indicate a timing based side-channel attack such as Meltdown and Spectre. The systems and methods described herein introduce uncertainty into the processor and system operating parameters based on the detected interval between or frequency of attempts to access the respective processor and system operating parameters.

Thus, the systems and methods disclosed herein introduce a level of uncertainty into system timing and/or performance parameters based on the frequency of attempts to read such system timing and/or performance parameters, such as an increase in the frequency of events demonstrating a high-risk of uncovering sensitive performance and/or timing data associated with the CPU and/or the CPU cache. For example, the systems and methods described herein may introduce uncertainty into timing and performance data in proportion to the frequency of system timing and/or performance parameters read attempts indicative of a timing based side-channel attack. Introducing uncertainty into system timing and/or performance parameters beneficially and advantageously minimizes or eliminates the usefulness of the parametric data to an attacker using a timing based side-channel attack such as Meltdown or Spectre.

A system to introduce controlled levels of uncertainty into one or more system parameters is provided. The system may include: processor circuitry; performance management circuitry coupled to the processor circuitry; and a storage device coupled to the performance management circuitry, the storage device including machine-readable instructions that, when executed by the performance management circuitry, cause the performance management circuitry to: measure a value representative of a first system parameter in response to an attempt to access information indicative of the first system parameter; determine a frequency of attempts to access the information indicative of the first system parameter; determine whether the frequency of attempts to access the information indicative of the first system parameter exceeds a threshold value; determine a level of uncertainty to combine with the first system parameter; and generate an externally visible second system parameter by combining the determined level of uncertainty with the measured value representative if the first system parameter responsive to a determination that the frequency of attempts to access the information indicative of the first system parameter exceeds the threshold value.

A method to introduce controlled levels of uncertainty into one or more system parameters is provided. The method may include: measuring a value representative of a first system parameter in response to an attempt to access information indicative of the first system parameter; determining, by the performance management circuitry, a frequency of attempts to access the information indicative of the first system parameter; determining, by the performance management circuitry, whether the frequency of attempts to access the information indicative of the first system parameter exceeds a threshold value; determining, by the performance management circuitry, a level of uncertainty to combine with the first system parameter; and generating, by the performance management circuitry, an externally visible second system parameter by combining the determined level of uncertainty with the measured value representative if the first system parameter responsive to a determination that the frequency of attempts to access the information indicative of the first system parameter exceeds the threshold value.

A non-transitory storage medium is provided. The non-transitory storage medium includes machine-readable instructions, that when executed by performance management circuitry causes the performance management circuitry to: measure a value representative of a first system parameter in response to an attempt to access information indicative of the first system parameter; determine a frequency of attempts to access information indicative of the first system parameter; determine whether the frequency of attempts to access the information indicative of the first system parameter exceeds a threshold value; determine a level of uncertainty to combine with the first system parameter; and generate an externally visible second system parameter by combining the determined level of uncertainty with the measured value representative if the first system parameter responsive to a determination that the frequency of attempts to access the information indicative of the first system parameter exceeds the threshold value.

An electronic device is provided. The electronic device may include: a printed circuit board; processor circuitry coupled to the printed circuit board; performance management circuitry coupled to the processor circuitry; and a storage device coupled to the performance management circuitry, the storage device including machine-readable instructions that, when executed by the performance management circuitry, cause the performance management circuitry to: measure a value representative of a first system parameter in response to an attempt to access information indicative of the first system parameter; determine an interrupt threshold value for the measured value indicative the first system parameter; determine a frequency of change to the value indicative of a first system parameter; determine whether the frequency of attempts to access the one or more system parameters exceeds an access threshold value; determine a level of uncertainty to combine with the first system parameter; generate a second system parameter by combining the determined level of uncertainty with the measured value representative if the first system parameter responsive to a determination that the frequency of attempts to access the information indicative of the first system parameter exceeds the access threshold value; and cause a system interrupt responsive to a determination that the second system parameter exceeds the interrupt threshold value.

A system to introduce controlled levels of uncertainty into one or more system parameters is provided. The system may include: means for measuring at a sampling rate a value representative of a first system parameter; means for determining a frequency of attempts to access information indicative of the first system parameter; means for determining whether the frequency of attempts to access the information indicative of the first system parameter exceeds a threshold value; means for determining a level of uncertainty to combine with the first system parameter; and means for generating an externally visible second system parameter by combining the determined level of uncertainty with the measured value representative if the first system parameter responsive to a determination that the frequency of attempts to access the information indicative of the first system parameter exceeds the threshold value.

According to example 38, there is provided a system to introduce controlled levels of uncertainty into one or more system parameters. The system may include: processor circuitry; performance management circuitry coupled to the processor circuitry; and a storage device coupled to the performance management circuitry, the storage device including machine-readable instructions that, when executed by the performance management circuitry, cause the performance management circuitry to: measure a value indicative of a first system parameter; determine an interrupt threshold value for the measured value indicative the first system parameter; determine a frequency of change to the value indicative of a first system parameter;

determine whether the frequency of attempts to access the one or more system parameters exceeds an access threshold value; determine a level of uncertainty to combine with the first system parameter; generate an externally visible second system parameter by combining the determined level of uncertainty with the measured value representative if the first system parameter responsive to a determination that the frequency of attempts to access the information indicative of the first system parameter exceeds the threshold value; and generate a system interrupt responsive to a determination that the externally visible second system parameter exceeds the interrupt threshold value.

As used herein, the term "processor cache" and "cache circuitry" refer to cache memory present within a processor or central processing unit (CPU) package. Such processor cache may variously be referred to, and should be considered to include, without limitation, Level 1 (L1) cache, Level 2 (L2) cache, Level 3 (L3) cache, and/or last or lowest level cache (LLC).

FIG. 1 provides a high level block diagram of an illustrative system 100 that includes a central processing unit (CPU) 110 that provides system performance and/or timing data $112_1$-$112_n$ (collectively, "system performance/timing data 112") to a coupled performance management unit (PMU) 160 having perturbation circuitry 170 capable of introducing a variable level of uncertainty into system performance/timing data performance data 172 accessible by an external entity 102, in accordance with at least one embodiment described herein. The system performance/timing data 112 provided by the CPU 110 to the PMU 160 may be generated by and/or sourced from one or more systems or circuits disposed at least partially within the CPU 110. The systems and circuits capable of providing such system performance/timing data 112 to the PMU 160 may include, but are not limited to: processor circuitry 120, cache circuitry 130, Translation Lookaside Buffer (TLB) circuitry 140 and/or Branch target buffer (BTB) circuitry 150.

In embodiments, the perturbation circuitry 170 receives the system performance/timing data 112 from the CPU 110 and/or from time stamp circuitry 180 disposed in the PMU 160. In embodiments, the CPU 110 may push all or a portion of the system performance/timing data 112 to the perturbation circuitry 170. In embodiments, the perturbation circuitry 170 may pull all or a portion of the system performance/timing data 112 from the CPU 110. The system performance/timing data 112 may be received by the perturbation circuitry 170 on a continuous, intermittent, periodic, aperiodic, or event-driven basis. The perturbation circuitry 170 monitors the received system performance/timing data 112 to detect abnormalities, patterns, changes, intervals between and/or frequencies of attempts to read or otherwise access system performance/timing data 112 that may indicate a high-risk of detection of the internal state of one or more components within the CPU 110. Upon detecting abnormalities, patterns, changes, intervals between and/or frequencies of attempts to read or otherwise access system performance/timing data 112 indicative of a high-risk of detection of the internal state of one or more components within the CPU 110, the perturbation circuitry 170 may add uncertainty into the system performance/timing data 112. For example, upon detecting a sudden increase in frequency reads or accesses of cache load times (as may occur with a timing based side-channel attack), the perturbation circuitry 170 may add a variable quantity of uncertainty to the externally visible cache load times reported by the PMU 160. In embodiments, the quantity of uncertainty introduced by the perturbation circuitry 170 may be proportional to or based upon the frequency of the attempts to read or otherwise access the system perfor-mance/timing data 112. Continuing with the above example, the perturbation circuitry 170 may introduce increasing levels of uncertainty into the externally visible cache load times in response to increasingly frequent attempts to read or otherwise access the cache load time data.

As depicted in FIG. 1, the CPU 110 may include processor circuitry 120, cache circuitry 130, Translation Lookaside Buffer (TLB) circuitry 140 and/or Branch target buffer (BTB) circuitry 150. Example CPUs 110 may include, but are not limited to, microprocessors such as Intel Pentium® microprocessor, Intel Core™ Duo processor, Intel Core i3, Intel Core i5, Intel Core i7, AMD Athlon™ processor, AMD Turion™ processor, AMD Sempron™, AMD Ryzen® processor, and ARM Cortex® processors.

The processor circuitry 120 may include any number and/or combination of electrical components, semiconductor devices, and/or logic elements capable of reading and executing machine-readable instruction sets. In embodiments, the processor circuitry 120 may include any number and/or combination of any currently available and/or future developed processors, microprocessors, controllers, and similar. In embodiments, the processor circuitry 120 may include circuitry capable of performing some or all of: fetching instructions 122, decoding the instructions 122, scheduling the instructions for execution, and executing some instructions while speculatively executing other instructions. In embodiments, the processor circuitry 120 may include one or more single- or multi-thread cores. In embodiments, the processor circuitry 120 may provide performance and/or timing data 112 to the perturbation circuitry 170 in the PMU 160. Example data may include, but is not limited to: execution of instructions affecting the contents of the cache circuitry 130 (Cache Line Flush—CLFLUSH; Cache Write Back and Invalidate—WBINVD, etc.).

In embodiments, the processor circuitry 120 may selectively provide the number, rate, interval between, and/or frequency of attempts to read or otherwise access system performance/timing data 112 to the perturbation circuitry 170 on an event-driven basis. For example, the processor circuitry 120 may provide the number, rate, interval between, and/or frequency of attempts to read or otherwise access system performance/timing data 112 to the perturbation circuitry 170 when the frequency, time interval between, and/or number of designated attempts to read or otherwise access system performance/timing data 112 (e.g., CLFLUSH, WBINVD) falls outside one or more threshold values and/or value ranges. In embodiments, the processor circuitry 120 may communicate the number, rate, interval between, and/or frequency of attempts to read or otherwise access system performance/timing data 112 to the perturbation circuitry 170 on a periodic (every 3, 5, 10, 50, 100, 500, 1000, 5000 clock cycles), an aperiodic, a continuous, or an intermittent basis. In other embodiments, the perturbation circuitry 170 may poll the processor circuitry 120 for the number, rate, interval between, and/or frequency of attempts to read or otherwise access system performance/timing data 112 on an event driven basis, such as upon the perturbation circuitry 170 receiving information or data indicative of a potential exposure of protected information. In yet other embodiments, the perturbation circuitry 170 may poll the processor circuitry 120 for the number, rate, interval between, and/or frequency of attempts to read or otherwise access system performance/timing data 112 on a periodic (every 3, 5, 10, 50, 100, 500, 1000, 5000 clock cycles), an aperiodic, a continuous, or an intermittent basis.

The cache circuitry 130 may include any number and/or combination of electrical components, semiconductor devices, and/or logic elements capable of non-persistently storing digital information and/or data. In embodiments, all or a portion of the cache circuitry 130 may be communicably coupled to a single processor circuit 120. In other embodiments, all or a portion of the cache circuitry 130 may be shared between multiple processor circuits 120A-120n. In embodiments, the cache circuitry 130 may store information and/or data as a cache line, for example, as a 64 byte cache line. In embodiments, the cache circuitry 130 may provide system performance/timing data 112 to the perturbation circuitry 170 in the PMU 160. Example system performance/timing data 112 provided by the cache circuitry 130 to the perturbation circuitry 170 may include, but is not limited to: data representative of the number and/or rate of cache misses; data representative of the number and/or rate of cache write-backs, and similar.

In embodiments, the cache circuitry 130 may selectively provide the number, rate, interval between, and/or frequency of attempts to read or otherwise access system performance/timing data 112 to the perturbation circuitry 170 on an event-driven basis. For example, the cache circuitry 130 may provide the number, rate, interval between, and/or frequency of attempts to read or otherwise access system performance/timing data 112 to the perturbation circuitry 170 when the number, rate, or frequency of attempts to read or otherwise access the number of cache misses or cache write backs fall outside one or more permissible threshold values and/or value ranges. In embodiments, the cache circuitry 130 may communicate the number, rate, interval between, and/or frequency of attempts to read or otherwise access system performance/timing data 112 to the perturbation circuitry 170 on a periodic (every 3, 5, 10, 50, 100, 500, 1000, 5000 clock cycles), an aperiodic, a continuous, or an intermittent basis. In other embodiments, the perturbation circuitry 170 may poll the cache circuitry 130 for the number, rate, interval between, and/or frequency of attempts to read or otherwise access system performance/timing data 112 on an event driven basis, such as upon the perturbation circuitry 170 receiving information or data indicative of a potential exposure of protected information. In yet other embodiments, the perturbation circuitry 170 may poll the cache circuitry 130 for the number, rate, interval between, and/or frequency of attempts to read or otherwise access system performance/timing data 112 on a periodic (every 3, 5, 10, 50, 100, 500, 1000, 5000 clock cycles), an aperiodic, a continuous, or an intermittent basis.

The TLB circuitry 140 may include any number and/or combination of currently available and/or future developed electrical components, semiconductor devices, and/or logic elements capable of providing an address-translation cache that stores the most recent virtual-to-physical memory address translations. Although depicted in FIG. 1 as disposed in the CPU 110, in embodiments, the TLB circuitry 140 may be disposed external to and coupled to the CPU 110. In embodiments, the TLB circuitry 140 may be included as a portion of memory management circuitry that is disposed in or coupled to the processor circuitry 120. In embodiments, all or a portion of the TLB circuitry 140 may be communicably coupled to a single processor circuit 120. In other embodiments, all or a portion of the TLB circuitry 140 may be shared between multiple processor circuits 120A-120n. In embodiments, the TLB circuitry 140 may provide system performance/timing data 112 to the perturbation circuitry 170 in the PMU 160. Example system performance/timing data 112 provided by the TLB circuitry 140 to the perturbation circuitry 170 may include, but is not limited to: data representative of the number and/or rate of TLB lookup misses; data representative of the number and/or rate of TLB invalidations, and similar.

In embodiments, the TLB circuitry 140 may selectively provide the number, rate, interval between, and/or frequency of attempts to read or otherwise access system performance/timing data 112 to the perturbation circuitry 170 on an event-driven basis. For example, the TLB circuitry 140 may provide the number, rate, interval between, and/or frequency of attempts to read or otherwise access system performance/timing data 112 to the perturbation circuitry 170 when the number, rate, interval between and/or frequency of attempts to read or otherwise access TLB misses or TLB invalidations fall outside one or more permissible or acceptable threshold values and/or value ranges. In embodiments, the TLB circuitry 140 may communicate the number, rate, interval between, and/or frequency of attempts to read or otherwise access system performance/timing data 112 to the perturbation circuitry 170 on a periodic (every 3, 5, 10, 50, 100, 500, 1000, 5000 clock cycles), an aperiodic, a continuous, or an intermittent basis. In other embodiments, the perturbation circuitry 170 may poll the TLB circuitry 140 for the number, rate, interval between, and/or frequency of attempts to read or otherwise access system performance/timing data 112 on an event driven basis, such as upon the perturbation circuitry 170 receiving information or data indicative of a potential exposure of protected information. In yet other embodiments, the perturbation circuitry 170 may poll the TLB circuitry 140 for the number, rate, interval between, and/or frequency of attempts to read or otherwise access system performance/timing data 112 on a periodic (every 3, 5, 10, 50, 100, 500, 1000, 5000 clock cycles), an aperiodic, a continuous, or an intermittent basis.

The BTB circuitry 150 may include any number and/or combination of currently available and/or future developed electrical components, semiconductor devices, and/or logic elements capable of providing a data store, data structure, or database that includes information and/or data associated with branch target prediction. Although depicted in FIG. 1 as disposed in the CPU 110, in embodiments, the BTB circuitry 150 may be disposed external to and coupled to the CPU 110. In embodiments, the BTB circuitry 150 may be included as a portion of memory management circuitry that is at least partially disposed in or coupled to the processor circuitry 120. In embodiments, all or a portion of the BTB circuitry 150 may be communicably coupled to a single processor circuit 120. In other embodiments, all or a portion of the BTB circuitry 150 may be shared between multiple processor circuits 120A-120n. In embodiments, the BTB circuitry 140 may provide system performance/timing data 112 to the perturbation circuitry 170 in the PMU 160. Example system performance/timing data 112 provided by the BTB circuitry 140 to the perturbation circuitry 170 may include, but is not limited to: data representative of the number and/or rate of BTB lookup misses, and similar.

In embodiments, the BTB circuitry 150 may selectively provide the number, rate, interval between, and/or frequency of attempts to read or otherwise access system performance/timing data 112 to the perturbation circuitry 170 on an event-driven basis. For example, the BTB circuitry 150 may provide the system performance/timing data 112 to the perturbation circuitry 170 when the number, rate, interval between, and/or frequency of attempts to read or otherwise access BTB miss data falls outside one or more permissible or acceptable threshold values and/or value ranges. In embodiments, the BTB circuitry 150 may communicate the number, rate, interval between, and/or frequency of attempts to read or otherwise access the system performance/timing data 112 to the perturbation circuitry 170 on a periodic (every 3, 5, 10, 50, 100, 500, 1000, 5000 clock cycles), an aperiodic, a continuous, or an intermittent basis. In other embodiments, the perturbation circuitry 170 may poll the BTB circuitry 150 for the number, rate, interval between, and/or frequency of attempts to read or otherwise access system performance/timing data 112 on an event driven basis, such as upon the perturbation circuitry 170 receiving information or data indicative of a potential exposure of protected information. In yet other embodiments, the perturbation circuitry 170 may poll the BTB circuitry 150 for the number, rate, interval between, and/or frequency of attempts to read or otherwise access performance/timing data 112 on a periodic (every 3, 5, 10, 50, 100, 500, 1000, 5000 clock cycles), an aperiodic, a continuous, or an intermittent basis.

The PMU 160 includes the performance monitoring circuitry 162, the perturbation circuitry 170, and time stamp circuitry 180. The performance monitoring circuitry 162 counts the occurrence of micro-architectural events within the CPU 110. Using this data, the performance monitoring circuitry is able to generate system performance metrics. In some embodiments, the time stamp circuitry 180 provides time stamp information 182 to the perturbation circuitry 170. Time stamp information 182 may be used in the determination of time-based system performance metrics may include, but are not limited to quantifying the interval(s) between event occurrences and/or determining an event occurrence frequency. Both interval and frequency data provide insight into system performance and application execution optimization. The PMU 160 also includes perturbation circuitry 170.

The perturbation circuitry 170 may include any number and/or combination of currently available and/or future developed electrical components, semiconductor devices, and/or logic elements capable of: collecting system performance/timing data 112 and time stamp data 182; analyzing the collected data; determining a value indicative of an uncertainty using the analyzed collected data; and adding the determined uncertainty value to one or more system parameters visible to an external party 102. In some implementations, the perturbation circuitry 170 may apply weighting factors to some or all of the received system performance/timing data 112. In embodiments, the perturbation circuity 170 may use the weighted or unweighted system performance/timing data 112 to detect, determine, or infer the occurrence of attempts to read or otherwise access the system performance/timing data 112 in one or more patterns indicative of a side-channel attack, such as Meltdown or Spectre.

In embodiments, the perturbation circuitry 170 may detect the occurrence of such a side-channel attack based, at least in part, on the interval, frequency, or rate of occurrence of attempts to read or otherwise access the system performance/timing data 112 as indicated or inferred by the weighted or unweighted performance/timing data 112. The perturbation circuitry 170 adds a level of uncertainty to the externally accessible system performance/timing data 172 to reduce the likelihood or eliminate the ability of a side-channel attack to obtain meaningful system information. For example, in a timing based side-channel attack based on the frequency of reads of cache load time data exceeding a defined threshold value, introducing uncertainty into cache load times may be sufficient to reduce the effectiveness of the side-channel attack since the attacker may no longer be able to distinguish data read from cache from data read from main memory.

In embodiments, the amount of uncertainty added by the that is proportional to or based in whole or in part on the determined interval, frequency or rate of occurrence one or more system events indicative of a side-channel attack such as Spectre or Meltdown. Events typifying a side-channel attack include, but are not limited to: increasing frequency of cache line flushes (CLFUSH) of the cache circuitry 130; increasing frequency of write-backs (WBINVD) of the cache circuitry 130; excessive data misses in the cache circuitry 130; increasing frequency of time stamp data 182 from time stamp circuitry 180; increasing frequency of branch misses in the BTB circuitry 150; increasing frequency of data misses in the TLB circuitry 140; increasing frequency of data invalidations in the TLB circuitry 140; and similar.

In embodiments, the perturbation circuitry 170 may introduce uncertainty into one or more externally accessible system parameters 172 that differs from the performance/timing data 112 received by the perturbation circuitry 170. For example, the perturbation circuitry 170 may add uncertainty to data read times (i.e., the externally accessible system parameter) based on receipt of performance/timing data 112 indicative of an increasing frequency of execution of CLFLUSH commands by the processor circuitry 120.

The storage device 190 may include any number and/or combination of currently available and/or future developed electrical components, semiconductor devices, and/or logic elements capable of storing machine-readable instructions that cause the perturbation circuitry 170 to introduce a level of uncertainty into one or more externally accessible system parameters 172 based on receipt of performance/timing data 112 indicative of a potential side-channel attack such as Meltdown or Spectre. In some embodiments, the storage device 190 may be disposed at least partially within the CPU 110.

Figure 2:
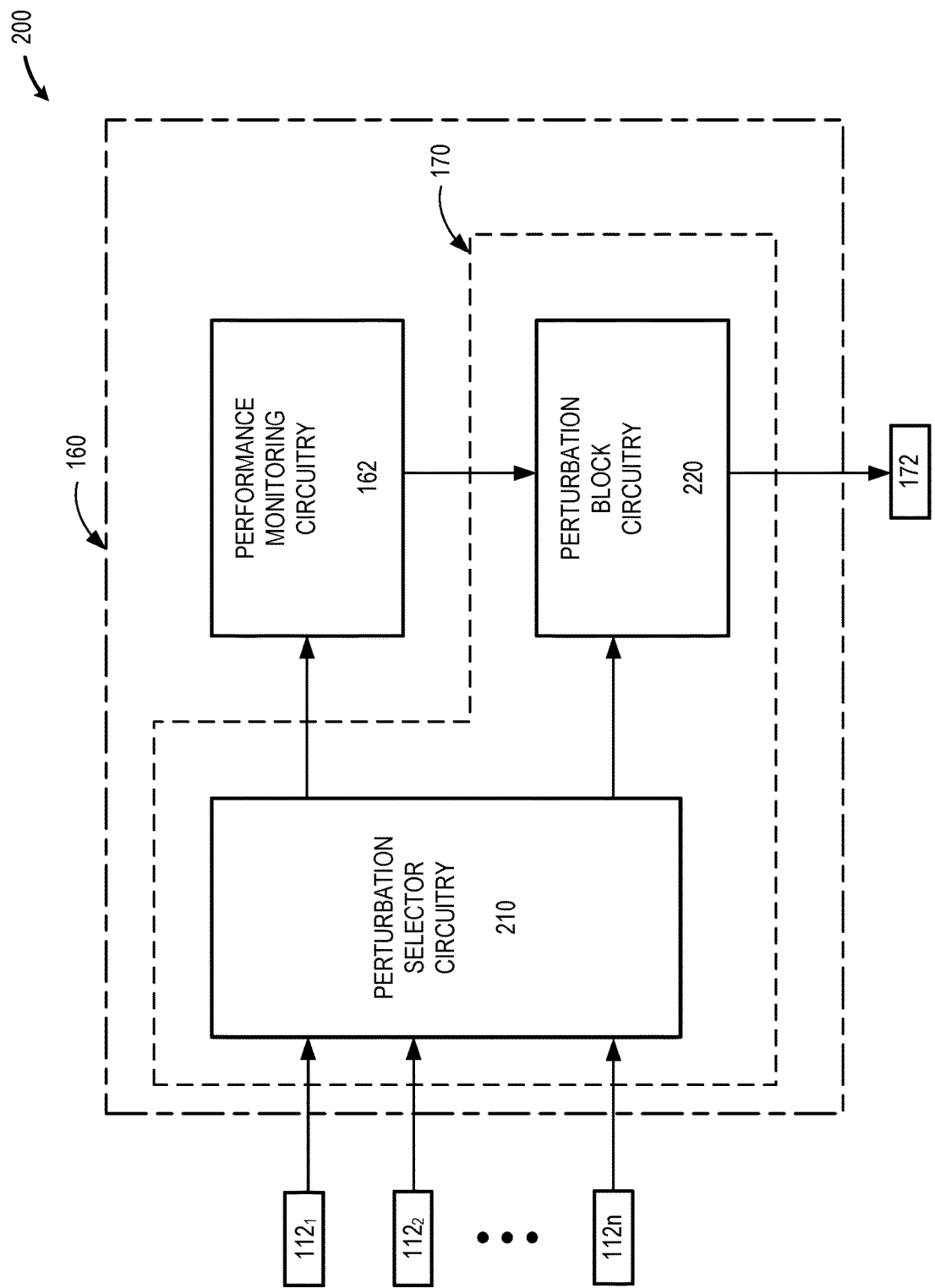
FIG. 2 is a block diagram of an illustrative performance monitoring unit (PMU) in which the perturbation circuitry includes perturbation selector circuitry coupled to perturbation block circuitry, in accordance with at least one embodiment described herein.

FIG. 2 is a block diagram of an illustrative performance monitoring unit (PMU) 160 in which the perturbation circuitry 170 includes perturbation selector circuitry 210 coupled to perturbation block circuitry 220, in accordance with at least one embodiment described herein. In embodiments, the perturbation selector circuitry 210 may include any number and/or combination of currently available and/or future developed electrical components, semiconductor devices, and/or logic elements capable of implementing a weighted measurement of the frequency of events and/or instructions having a high risk of uncovering or exposing the internal state of one or more CPU components (e.g., the cache circuitry 130).

The perturbation selector circuitry 210 also determines a value corresponding to a level of uncertainty to introduce to the externally accessible system performance/timing data 172. In embodiments, the perturbation selector circuitry 210 counts the number of occurrences of events and/or instructions having a high risk of uncovering or exposing the internal state of one or more CPU components. In embodiments, the perturbation selector circuitry 210 may be coupled in parallel with the performance monitoring circuitry 162 such that the performance/timing data 112 is received by both the perturbation selector circuitry 210 and the performance monitoring circuitry 162. In embodiments, the machine-readable instructions executed by the perturbation selector circuitry 210 may define multipliers used by the perturbation selector circuitry 210 for each type of detected event occurrence. The perturbation selector circuitry 210 programming may be performed via one or more model specific registers (MSR) that permits at least: enablement, disablement, and/or locking of the perturbation selector circuitry 210 functionality; and definition of weights for specific event occurrences and/or groups of event occurrences.

In embodiments, the perturbation selector circuitry 210 may include circuitry that counts event occurrences using a counter value (Counter$_i$) that serves as an input to a function F. The function F applies a function such as $e^{Counter}$ or Counter$^2$ to prevent averaging by an attacker. In embodiments, the perturbation selector circuitry 210 may determine an uncertainty level using the following equation:

$$\text{Uncertainty Value} = \Sigma F(\text{Counter}_i)_i * \text{Multiplier}_i \quad (1)$$

The perturbation selector circuitry 210 may measure event occurrence frequency by observation over a plurality of regular or irregular time intervals or by determining the interval between signals indicative of an event occurrence. In embodiments, determination of the interval between signals indicative of an event occurrence may beneficially provide faster response of the uncertainty value determined by the perturbation selector circuitry 210.

The perturbation block circuitry 220 adds the uncertainty value determined by the perturbation selector circuitry 210 to the externally accessible system performance data 172. The perturbation block circuitry 220 may combine the performance/timing data 112 with the uncertainty value determined by the perturbation selector circuitry 210 using any of the following example equations implemented using fixed point math, beneficially eliminating the need for expensive floating point math blocks:

$$\text{Value} = \text{Data} + (\text{RND} * \text{Uncertainty Value}) \quad (2)$$

$$\text{Value} = \text{Data} + (\text{RND} * \text{Uncertainty Value}) - \text{RND} * \text{Bias} \quad (3)$$

$$\text{Value} = \text{Data} + ((\text{RND} - 0.5) * \text{Uncertainty Value}) \quad (4)$$

Where:
RND=Random Value between 0 and 1
Bias=Programmable value to permit negative shifts)

Figure 3:
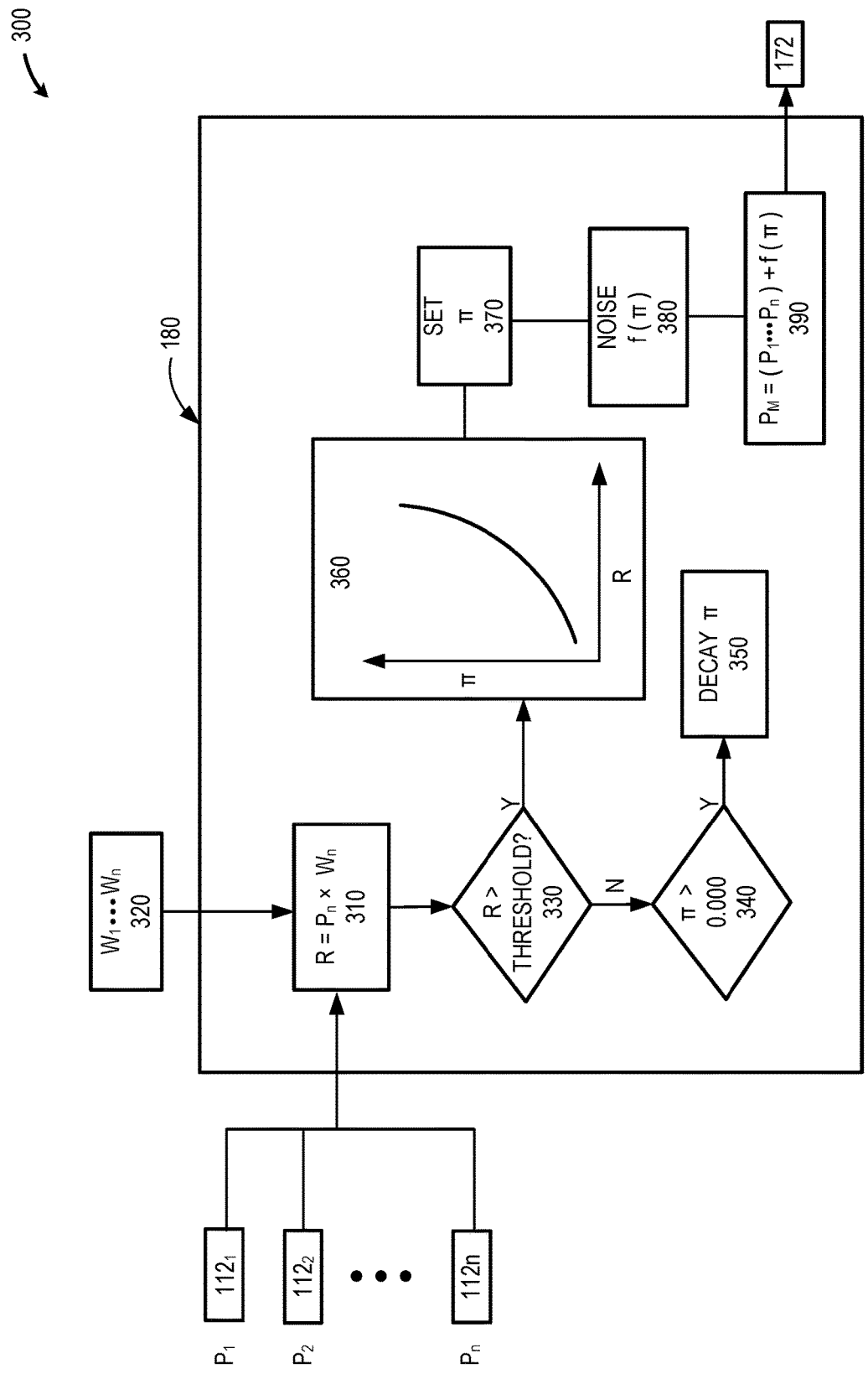
FIG. 3 is a block flow diagram of an illustrative method to selectively add uncertainty to externally visible system data using perturbation circuitry, in accordance with at least one embodiment described herein.

FIG. 3 is a block flow diagram of an illustrative method 300 to selectively add uncertainty to externally visible system data using perturbation circuitry 170, in accordance with at least one embodiment described herein. In embodiments, at 310, the perturbation selector circuitry 210 modifies the raw performance/timing data 112 by multiplying the received performance/timing data 112$_1$-112$_n$ by a respective weighting factor (W$_1$-W$_n$) 320 (collectively, "weighting factors 320"). In embodiments, some or all of the weighting factors 320 may include a user entered value. In other embodiments, some or all of the weighting factors 320 may include a value autonomously determined by the PMU 160, the perturbation circuitry 170, and/or the processor circuitry 190. In embodiments, the weighting factors 320 may be normalized to a 0-1 scale.

At 330, the perturbation selector circuitry 210 determines whether the weighted performance/timing data 112 is greater than a defined threshold value. If the weighted performance/timing data 112 is less than the defined threshold value, the perturbation selector circuitry 210 determines, at 340, whether the uncertainty value ($\pi_1$-$\pi_n$) associated with the respective performance/timing data 112$_1$-112$_n$ is less than a defined value, such as zero. If the uncertainty value associated with the respective performance/timing data 112$_1$-112$_n$ is greater than the defined value, the perturbation selector circuitry 210 decays the uncertainty value $\pi_1$-$\pi_n$ at 350.

On the other hand, if the perturbation selector circuitry 210 determines the weighted performance/timing data 112 is greater than the defined threshold value at 330, the perturbation selector circuitry 210 determines, at 360, an uncertainty value (it) for the respective performance/timing data 112$_1$-112$_n$. The relationship between the uncertainty value and the respective performance/timing data 112$_1$-112$_n$ may be linear, exponential, logarithmic, empirical, or any other mathematically definable relationship. At 370, the perturbation selector circuitry 210 determines, sets, or otherwise selects the uncertainty value $\pi_x$ for the respective performance/timing data 112$_x$. In some embodiments, the perturbation selector circuitry 210 may use a mathematical algorithm based upon the weighted performance/timing data 112$_x$ to determine the uncertainty value $\pi_x$. In embodiments, the perturbation selector circuitry 210 may determine an uncertainty value $\pi_x$ based upon the frequency or interval between one or more event occurrences. At 380, using the uncertainty value $\pi_x$ determined at 370, the perturbation selector circuitry 210 may determine, set, or otherwise select the uncertainty to apply to one or more externally visible system performance parameters or metrics. In embodiments, the perturbation selector circuitry 210 may use a mathematical algorithm (e.g., f($\pi_x$)) to generate a noise value to introduce to the externally visible system performance parameter or metric. At 390, the perturbation block circuitry 220 adds the noise value f($\pi_x$) to the externally visible system data to beneficially provide an externally visible output 172 combined with a controller degree of uncertainty.

Figure 4:
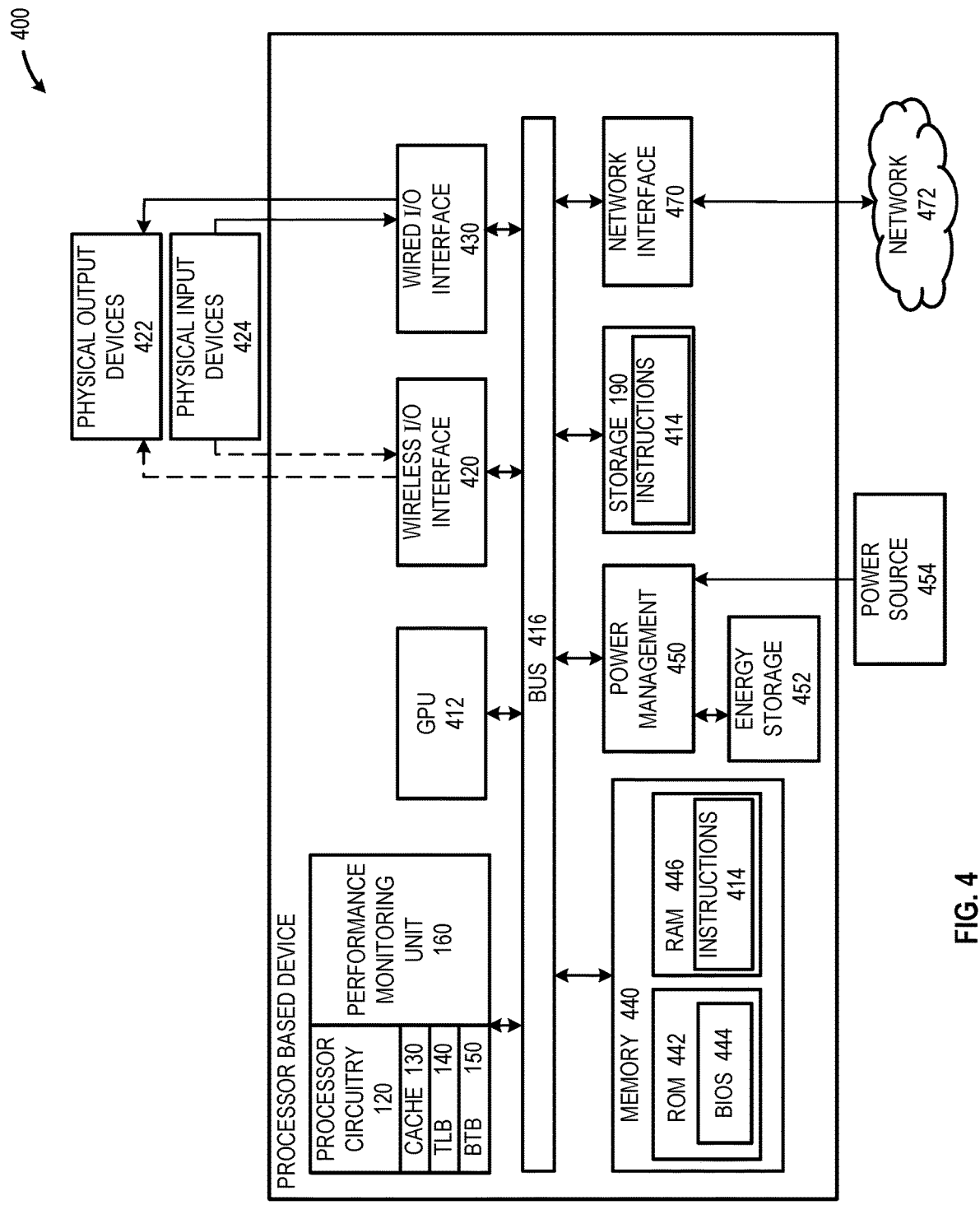
FIG. 4 is a schematic diagram of an illustrative electronic, processor-based, device that includes a CPU having processor circuitry, cache circuitry, TLB circuitry, BTB circuitry, and a performance monitoring unit that introduces a controlled level of uncertainty into one or more externally accessible system parameters or metrics in response to event occurrences indicative of a side-channel attack, in accordance with at least one embodiment described herein.

FIG. 4 is a schematic diagram of an illustrative electronic, processor-based, device 400 that includes a CPU 110 having processor circuitry 120, cache circuitry 130, TLB circuitry 140, BTB circuitry 150, and a performance monitoring unit 160 that introduces a controlled level of uncertainty into one or more externally accessible system parameters or metrics in response to event occurrences indicative of a side-channel attack, in accordance with at least one embodiment described herein. The processor-based device 400 may additionally include one or more of the following: a graphical processing unit 412, a wireless input/output (I/O) interface 420, a wired I/O interface 430, main memory 440, power management circuitry 450, a non-transitory storage device 190, and a network interface 470. The following discussion provides a brief, general description of the components forming the illustrative processor-based device 400. Example, non-limiting processor-based devices 400 may include, but are not limited to: smartphones, wearable computers, portable computing devices, handheld computing devices, desktop computing devices, blade server devices, workstations, and similar.

The processor-based device 400 includes processor circuitry 120 and a performance management unit 160 that execute machine-readable instructions 414. At least a portion of the instructions 414 may cause either or both the processor circuitry 120 and/or the performance management unit 160 to use performance/timing data 112 to detect an occurrence of one or more defined events that may be indicative of an in-progress side-channel attack, such as Spectre or Meltdown. In embodiments, the time stamp circuitry 180 in the PMU 160 may determine a frequency of or interval between some or all of the one or more defined events using the performance/timing data 112. Responsive to detecting event occurrences indicative of an in-process side-channel attack, the perturbation circuitry 170 in the PMU 160 may determine a level of uncertainty to introduce to some or all of the externally visible system performance parameters or metrics. In embodiments, the perturbation circuitry 170 may provide a variable, controlled, level of uncertainty based on one or more of: the type of event occurrence; the frequency of or interval between event occurrences; or a defined hierarchical severity of the event occurrence.

In some embodiments, the processor-based device 400 includes graphics processor circuitry 412 capable of executing machine-readable instruction sets 414 and generating an output signal capable of providing a display output to a system user. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuitry 120 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The processor-based device 400 includes a bus or similar communications link 416 that communicably couples and facilitates the exchange of information and/or data between various system components including the processor circuitry 120, the graphics processor circuitry 412, one or more wireless I/O interfaces 420, one or more wired I/O interfaces 430, the system memory 440, one or more storage devices 190, and/or one or more network interfaces 470. The processor-based device 400 may be referred to in the singular herein, but this is not intended to limit the embodiments to a single processor-based device 400, since in certain embodiments, there may be more than one processor-based device 400 that incorporates, includes, or contains any number of communicably coupled, collocated, or remote networked circuits or devices.

The processor circuitry 120 may include any number, type, or combination of currently available or future developed devices capable of executing machine-readable instruction sets.

The processor circuitry 120 may include but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 4 are of conventional design. Consequently, such blocks need not be described in further detail herein, as they will be understood by those skilled in the relevant art. The bus 416 that interconnects at least some of the components of the processor-based device 400 may employ any currently available or future developed serial or parallel bus structures or architectures.

The system memory 440 may include read-only memory ("ROM") 442 and random access memory ("RAM") 446. A portion of the ROM 442 may be used to store or otherwise retain a basic input/output system ("BIOS") 444. The BIOS 444 provides basic functionality to the processor-based device 400, for example by causing the processor circuitry 120 to load and/or execute one or more machine-readable instruction sets 414. In embodiments, at least some of the one or more machine-readable instruction sets 414 cause at least a portion of the processor circuitry 120 to provide, create, produce, transition, and/or function as a dedicated, specific, and particular machine, for example a word processing machine, a digital image acquisition machine, a media playing machine, a gaming system, a communications device, a smartphone, or similar.

The processor-based device 400 may include at least one wireless input/output (I/O) interface 420. The at least one wireless I/O interface 420 may be communicably coupled to one or more physical output devices 422 (tactile devices, video displays, audio output devices, hardcopy output devices, etc.). The at least one wireless I/O interface 420 may communicably couple to one or more physical input devices 424 (pointing devices, touchscreens, keyboards, tactile devices, etc.). The at least one wireless I/O interface 420 may include any currently available or future developed wireless I/O interface. Example wireless I/O interfaces include, but are not limited to: BLUETOOTH®, near field communication (NFC), and similar.

The processor-based device 400 may include one or more wired input/output (I/O) interfaces 430. The at least one wired I/O interface 430 may be communicably coupled to one or more physical output devices 422 (tactile devices, video displays, audio output devices, hardcopy output devices, etc.). The at least one wired I/O interface 430 may be communicably coupled to one or more physical input devices 424 (pointing devices, touchscreens, keyboards, tactile devices, etc.). The wired I/O interface 430 may include any currently available or future developed I/O interface. Example wired I/O interfaces include, but are not limited to: universal serial bus (USB), IEEE 1394 ("FireWire"), and similar.

The processor-based device 400 may include one or more communicably coupled, non-transitory, data storage devices 190. The data storage devices 190 may include one or more hard disk drives (HDDs) and/or one or more solid-state storage devices (SSDs). The one or more data storage devices 190 may include any current or future developed storage appliances, network storage devices, and/or systems. Non-limiting examples of such data storage devices 190 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 190 may include one or more removable storage devices, such as one or more flash drives, flash memories, flash storage units, or similar appliances or devices capable of communicable coupling to and decoupling from the processor-based device 400.

The one or more data storage devices 190 may include interfaces or controllers (not shown) communicatively coupling the respective storage device or system to the bus 416. The one or more data storage devices 190 may store, retain, or otherwise contain machine-readable instruction sets, data structures, program modules, data stores, databases, logical structures, and/or other data useful to the processor circuitry 120 and/or graphics processor circuitry 412 and/or one or more applications executed on or by the processor circuitry 120 and/or graphics processor circuitry 412. In some instances, one or more data storage devices 190 may be communicably coupled to the processor circuitry 120, for example via the bus 416 and/or via one or more wired communications interfaces 430 (e.g., Universal Serial Bus or USB); one or more wireless communications interfaces 420 (e.g., Bluetooth®, Near Field Communication or NFC); and/or one or more network interfaces 470 (IEEE 802.3 or Ethernet, IEEE 802.11, or WiFi®, etc.).

Processor-readable instruction sets 414 and other programs, applications, logic sets, and/or modules may be stored in whole or in part in the system memory 440. Such instruction sets 414 may be transferred, in whole or in part, from the one or more data storage devices 190. The instruction sets 414 may be loaded, stored, or otherwise retained in system memory 440, in whole or in part, during execution by the processor circuitry 120 and/or graphics processor circuitry 412. The processor-readable instruction sets 414 may include machine-readable and/or processor-readable code, instructions, or similar logic capable of causing the processor circuitry 120 and/or the PMU 160 to detect performance/timing data 112 representative of an occurrence of one or more events indicative of a side-channel attack, such as Meltdown or Spectre. The processor-readable instruction sets 414 also cause the perturbation circuitry 170 in the PMU 160 to introduce a reversible, variable, controlled, quantity of uncertainty into one or more externally visible system performance parameters or metrics 172. In embodiments, the processor-readable instruction sets 414 may weight the received performance/timing data 112. In embodiments, the processor-readable instruction sets 414 may cause the perturbation circuitry 170 to introduce a variable quantity of uncertainty into the externally visible system performance parameters or metrics 172 based on the frequency of or interval between the events indicative of the side-channel attack.

The processor-based device 400 may include power management circuitry 450 that controls one or more operational aspects of the energy storage device 452. In embodiments, the energy storage device 452 may include one or more primary (i.e., non-rechargeable) or secondary (i.e., rechargeable) batteries or similar energy storage devices. In embodiments, the energy storage device 452 may include one or more supercapacitors or ultracapacitors. In embodiments, the power management circuitry 450 may alter, adjust, or control the flow of energy from an external power source 454 to the energy storage device 452 and/or to the processor-based device 400. The power source 454 may include, but is not limited to, a solar power system, a commercial electric grid, a portable generator, an external energy storage device, or any combination thereof.

For convenience, the processor circuitry 120, the graphics processor circuitry 412, the wireless I/O interface 420, the wired I/O interface 430, the power management circuitry 450, the storage device 190, and the network interface 470 are illustrated as communicatively coupled to each other via the bus 416, thereby providing connectivity between the above-described components. In alternative embodiments, the above-described components may be communicatively coupled in a different manner than illustrated in FIG. 4. For example, one or more of the above-described components may be directly coupled to other components, or may be coupled to each other, via one or more intermediary components (not shown). In another example, one or more of the above-described components may be integrated into the processor circuitry 120, the PMU 160, and/or the graphics processor circuitry 412. In some embodiments, all or a portion of the bus 416 may be omitted and the components are coupled directly to each other using suitable wired or wireless connections.

Figure 5:
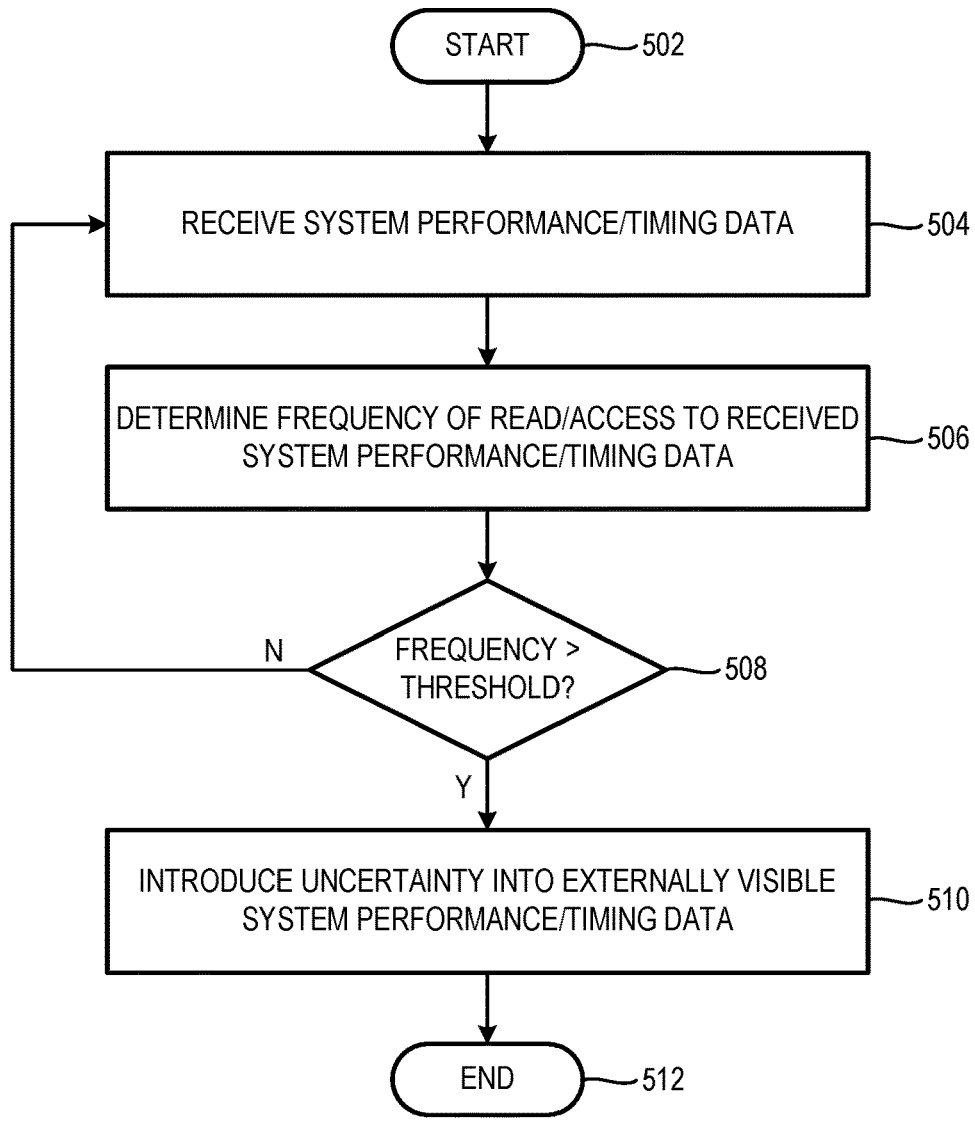
FIG. 5 is a high-level flow diagram of an illustrative method of introducing a variable, controlled, quantity of uncertainty into one or more externally accessible system performance parameters or metrics based on receipt of performance/timing data that may indicate one or more event occurrences associated with a side-channel attack such as a Meltdown or Spectre, in accordance with at least one embodiment described herein.

FIG. 5 is a high-level flow diagram of an illustrative method 500 of introducing a variable, controlled, quantity of uncertainty into one or more externally accessible system performance parameters or metrics based on receipt of performance/timing data 112 that may indicate one or more event occurrences associated with a side-channel attack such as a Meltdown or Spectre. The PMU 160 includes perturbation circuitry 170 that determines a level of uncertainty to add to the externally visible system parameters or metrics 172. In embodiments, the level of uncertainty introduced to the externally visible system parameters or metrics 172 may be based, at least in part, on the frequency or interval at which the event indicative of a side-channel attack occurs based on the performance/timing data 112 received by the perturbation circuitry 170. The method 500 commences at 502.

At 504, the PMU 160 receives performance/timing data 112. In embodiments, the performance/timing data 112 may be generated by one or more of: processor circuitry 120, cache circuitry 130, TLB circuitry 140, or BTB circuitry 150. The performance/timing data 112 may include data indicative of one or more of the following: changes in the cache circuitry, including cache misses and/or write-backs; changes in the BTB including BTB misses; and/or changes in the TLB circuitry, including TLB misses and data invalidations. In some implementations, weighting factors may be applied to at least a portion of the received performance/timing data 112.

At 506, the perturbation circuitry 170 receives time stamp information from time stamp circuitry 180. In embodiments, the time stamp circuitry 180 may be disposed at least partially within the PMU. In embodiments, the perturbation circuitry 170 may determine a frequency or interval of one or more event occurrences using the received performance/timing data 112 and the received time stamp circuitry 180. In embodiments, the perturbation selector circuitry 210 may determine the frequency or interval of one or more event occurrences using the received performance/timing data 112 and the received time stamp circuitry 180.

At 508, the perturbation circuitry 170 determines whether the frequency or interval of the event occurrence exceeds a defined threshold value. In some implementations, each different performance/timing data 112 may have the same or a different defined threshold value. In embodiments, the perturbation selector circuitry 210 may determine whether the frequency or interval of event occurrence exceeds the defined threshold value. If the frequency or interval is less than the defined threshold value, the method 500 returns to 504. If the frequency or interval is greater than the defined threshold value, the method 500 continues to 510.

At 510, the perturbation circuitry 170 determines a magnitude or value of uncertainty to introduce to one or more externally visible system parameters or metrics 172. In embodiments, the perturbation circuitry 170 may determine the value of uncertainty using one or more algorithms, one or more look-up tables, one or more data stores, or combinations thereof. In embodiments, the perturbation selector circuitry 210 may determine the value of uncertainty using one or more algorithms, one or more look-up tables, one or more data stores, or combinations thereof.

The perturbation circuitry 170 may combine the determined uncertainty value with one or more externally visible system parameters or metrics 172 such that the externally visible system parameters or metrics 172 have minimal or no use as indicators in a side-channel attack such as a Meltdown or Spectre side-channel attack. In embodiments, the perturbation block circuitry 220 may combine the determined uncertainty value with one or more externally visible system parameters or metrics 172. The method 500 concludes at 512.

While FIG. 5 illustrates various operations according to one or more embodiments, it is to be understood that not all of the operations depicted in FIG. 5 are necessary for other embodiments. Indeed, it is fully contemplated herein that in other embodiments of the present disclosure, the operations depicted in FIG. 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods for mitigating or eliminating the effectiveness of a side channel attack, such as a Meltdown or Spectre type attack by selectively introducing a variable, but controlled, quantity of uncertainty into the externally accessible system parameters visible and useful to the attacker. The systems and methods described herein provide perturbation circuitry that includes perturbation selector circuitry and perturbation block circuitry. The perturbation selector circuitry detects a potential attack by monitoring the performance/timing data generated by the processor. Upon detecting an attack, the perturbation selector circuitry determines a variable quantity of uncertainty to introduce to the externally accessible system data. The perturbation block circuitry adds the determined uncertainty into the externally accessible system data. The added uncertainty may be based on the frequency or interval of the event occurrences indicative of an attack.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for introducing a controlled uncertainty in externally visible system operating parameters in response to an increased parameter read frequency indicative of a timing-based side channel attack.

According to example 1, there is provided a system to introduce controlled levels of uncertainty into one or more system parameters. The system may include: processor circuitry; performance management circuitry coupled to the processor circuitry; and a storage device coupled to the performance management circuitry, the storage device including machine-readable instructions that, when executed by the performance management circuitry, cause the performance management circuitry to: measure a value representative of a first system parameter in response to an attempt to access information indicative of the first system parameter; determine a frequency of attempts to access the information indicative of the first system parameter; determine whether the frequency of attempts to access the information indicative of the first system parameter exceeds a threshold value; determine a level of uncertainty to combine with the first system parameter; and generate an externally visible second system parameter by combining the determined level of uncertainty with the measured value representative if the first system parameter responsive to a determination that the frequency of attempts to access the information indicative of the first system parameter exceeds the threshold value.

Example 2 may include elements of example 1 where the instructions further cause the performance management circuitry to determine a level of uncertainty proportional to the frequency of attempts to access information indicative of the first system parameter.

Example 3 may include elements of any of examples 1 or 2 where the first system parameter comprises one or more processor circuitry performance parameters.

Example 4 may include elements of any of examples 1 through 3 where the processor circuitry includes processor cache circuitry; where the one or more processor circuitry performance parameters includes one or more processor cache circuitry usage parameters; and where the one or more processor cache circuitry usage parameters include at least one of: one or more processor cache circuitry miss rate parameters; or one or more processor cache circuitry data write-back parameters.

Example 5 may include elements of any of examples 1 through 4 where the processor circuitry includes branch target buffer (BTB) circuitry; where the one or more processor circuitry performance parameters includes one or more BTB circuitry performance parameters; and where the one or more BTB circuitry performance parameters includes one or more BTB circuitry miss rate parameters.

Example 6 may include elements of any of examples 1 through 5 where the processor circuitry includes address translation lookaside buffer (TLB) circuitry; where the one or more processor circuitry performance parameters includes one or more TLB circuitry performance parameters; and where the one or more TLB circuitry performance parameters include at least one of: one or more TLB circuitry miss rate parameters; or one or more TLB circuitry entry invalidation parameters.

Example 7 may include elements of any of examples 1 through 6 where the first system parameter comprises one or more performance management circuitry parameters.

Example 8 may include elements of any of examples 1 through 7 where the performance management circuitry includes time stamp circuitry; and where the one or more performance management circuitry parameters include one or more time stamp circuitry parameters.

According to example 9, there is provided a method to introduce controlled levels of uncertainty into one or more system parameters. The method may include: measuring a value representative of a first system parameter in response to an attempt to access information indicative of the first system parameter; determining, by the performance management circuitry, a frequency of attempts to access the information indicative of the first system parameter; determining, by the performance management circuitry, whether the frequency of attempts to access the information indicative of the first system parameter exceeds a threshold value; determining, by the performance management circuitry, a level of uncertainty to combine with the first system parameter; and generating, by the performance management circuitry, an externally visible second system parameter by combining the determined level of uncertainty with the measured value representative if the first system parameter responsive to a determination that the frequency of attempts to access the information indicative of the first system parameter exceeds the threshold value.

Example 10 may include elements of example 9 where determining a level of uncertainty to combine with the first system parameter may include: determining, by the performance management circuitry, a level of uncertainty proportional to the frequency of attempts to access information indicative of the first system parameter.

Example 11 may include elements of any of examples 9 or 10 where measuring at a sampling rate a value representative of a first system parameter may include: measuring at the sampling rate, by the performance management circuitry, a value representative of one or more processor circuitry performance parameters.

Example 12 may include elements of any of examples 9 through 11 where measuring at the sampling rate a value representative of one or more processor circuitry performance parameters may include: measuring, by the performance management circuitry, a value indicative of one or more processor cache circuitry usage parameters; where the one or more processor cache circuitry usage parameters include at least one of: one or more processor cache circuitry miss rate parameters; or one or more processor cache circuitry data write-back parameters.

Example 13 may include elements of any of examples 9 through 12 where measuring at the sampling rate a value representative of one or more processor circuitry performance parameters may include: measuring, by the performance management circuitry, a value indicative of one or more branch target buffer (BTB) circuitry performance parameters; where the one or more BTB circuitry performance parameters includes one or more BTB circuitry miss rate parameters.

Example 14 may include elements of any of examples 9 through 13 where measuring at the sampling rate a value representative of one or more processor circuitry performance parameters may include: measuring, by the performance management circuitry, a value indicative of one or more translation lookaside buffer (TLB) circuitry performance parameters; where the one or more TLB circuitry performance parameters include at least one of: one or more TLB circuitry miss rate parameters; or one or more TLB circuitry entry invalidation parameters.

Example 15 may include elements of any of examples 9 through 14 where measuring at a sampling rate a value representative of a first system parameter may include: measuring at the sampling rate, by the performance management circuitry, a value representative of one or more performance management circuitry parameters; where the one or more performance management circuitry parameters include a value indicative of one or more time stamp circuitry data read parameters.

According to example 16, there is provided a non-transitory storage medium that includes machine-readable instructions, that when executed by performance management circuitry causes the performance management circuitry to: measure a value representative of a first system parameter in response to an attempt to access information indicative of the first system parameter; determine a frequency of attempts to access the information indicative of the first system parameter; determine whether the frequency of attempts to access the information indicative of the first system parameter exceeds a threshold value; determine a level of uncertainty to combine with the first system parameter; and generate an externally visible second system parameter by combining the determined level of uncertainty with the measured value representative if the first system parameter responsive to a determination that the frequency of attempts to access the information indicative of the first system parameter exceeds the threshold value.

Example 17 may include elements of example 16 where the machine-readable instructions that cause the performance monitoring circuitry to determine a level of uncertainty to combine with the first system parameter may cause the performance monitoring circuitry to: determine a level of uncertainty proportional to the frequency of attempts to access information indicative of the first system parameter.

Example 18 may include elements of any of examples 16 or 17 where the machine-readable instructions that cause the performance monitoring circuitry to measure, at the sampling rate, the value representative of a first system parameter cause the performance monitoring circuitry to: measure, at the sampling rate, a value representative of one or more processor circuitry performance parameters.

Example 19 may include elements of any of examples 16 through 18 where the machine-readable instructions that cause the performance monitoring circuitry to measure, at the sampling rate, a the value representative of one or more processor circuitry performance parameters cause the performance monitoring circuitry to: measure, at the sampling rate, a value representative of one or more processor cache circuitry usage parameters; where the one or more processor cache circuitry usage parameters include at least one of: one or more processor cache circuitry miss rate parameters; or one or more processor cache circuitry data write-back parameters.

Example 20 may include elements of any of examples 16 through 19 where the machine-readable instructions that cause the performance monitoring circuitry to measure, at the sampling rate, a the value representative of one or more processor circuitry performance parameters cause the performance monitoring circuitry to: measure, at the sampling rate, a value representative of one or more branch target buffer (BTB) circuitry performance parameters; where the one or more BTB circuitry performance parameters includes one or more BTB circuitry miss rate parameters.

Example 21 may include elements of any of examples 16 through 20 where the machine-readable instructions that cause the performance monitoring circuitry to measure, at the sampling rate, a the value representative of one or more processor circuitry performance parameters cause the performance monitoring circuitry to: measure, at the sampling rate, a value representative of one or more translation lookaside buffer (TLB) circuitry performance parameters; where the one or more TLB circuitry performance parameters include at least one of: one or more TLB circuitry miss rate parameters; or one or more TLB circuitry entry invalidation parameters.

Example 22 may include elements of any of examples 16 through 21 where the machine-readable instructions that cause the performance monitoring circuitry to measure, at the sampling rate, the value representative of a first system parameter cause the performance monitoring circuitry to: measure, at the sampling rate, a value representative of one or more performance management circuitry parameters; where the one or more performance management circuitry parameters include a value indicative of one or more time stamp circuitry data read parameters.

According to example 23, there is provided an electronic device. The electronic device may include: a printed circuit board; processor circuitry coupled to the printed circuit board; performance management circuitry coupled to the processor circuitry; and a storage device coupled to the performance management circuitry, the storage device including machine-readable instructions that, when executed by the performance management circuitry, cause the performance management circuitry to: measure a value representative of a first system parameter in response to an attempt to access information indicative of the first system parameter; determine a frequency of attempts to access information indicative of the first system parameter; determine whether the frequency of attempts to access the information indicative of the first system parameter exceeds a threshold value; determine a level of uncertainty to combine with the first system parameter; and generate an externally visible second system parameter by combining the determined level of uncertainty with the measured value representative if the first system parameter responsive to a determination that the frequency of attempts to access the information indicative of the first system parameter exceeds the threshold value.

Example 24 may include elements of example 23 where the instructions further cause the performance management circuitry to determine a level of uncertainty proportional to the frequency of attempts to access information indicative of the first system parameter.

Example 25 may include elements of any of examples 23 or 24 where the first system parameter comprises one or more processor circuitry performance parameters.

Example 26 may include elements of any of examples 23 through 25 where the processor circuitry includes processor cache circuitry; where the one or more processor circuitry performance parameters includes one or more processor cache circuitry usage parameters; and where the one or more processor cache circuitry usage parameters include at least one of: one or more processor cache circuitry miss rate parameters; or one or more processor cache circuitry data write-back parameters.

Example 27 may include elements of any of examples 23 through 26 where the processor circuitry includes branch target buffer (BTB) circuitry; where the one or more processor circuitry performance parameters includes one or more BTB circuitry performance parameters; and where the one or more BTB circuitry performance parameters includes one or more BTB circuitry miss rate parameters.

Example 28 may include elements of any of examples 23 through 27 where the processor circuitry includes address translation lookaside buffer (TLB) circuitry; where the one or more processor circuitry performance parameters includes one or more TLB circuitry performance parameters; and where the one or more TLB circuitry performance parameters include at least one of: one or more TLB circuitry miss rate parameters; or one or more TLB circuitry entry invalidation parameters.

Example 29 may include elements of any of examples 23 through 28 where the first system parameter comprises one or more performance management circuitry parameters.

Example 30 may include elements of any of examples 23 through 29 where the performance management circuitry includes time stamp circuitry; and where the one or more performance management circuitry parameters include one or more time stamp circuitry parameters.

According to example 31, there is provided a system to introduce controlled levels of uncertainty into one or more system parameters. The system may include: means for measuring at a sampling rate a value representative of a first system parameter; means for determining a frequency of attempts to access information indicative of the first system parameter; means for determining whether the frequency of attempts to access the information indicative of the first system parameter exceeds a threshold value; means for determining a level of uncertainty to combine with the first system parameter; and means for generating an externally visible second system parameter by combining the determined level of uncertainty with the measured value representative if the first system parameter responsive to a determination that the frequency of attempts to access the information indicative of the first system parameter exceeds the threshold value.

Example 32 may include elements of example 31 where the means for determining a level of uncertainty to combine with the first system parameter may include: means for determining a level of uncertainty proportional to the frequency of attempts to access information indicative of the first system parameter.

Example 33 may include elements of any of examples 31 or 32 where the means for measuring at a sampling rate a value representative of a first system parameter may include: means for measuring, at the sampling rate, a value representative of one or more processor circuitry performance parameters.

Example 34 may include elements of any of examples 31 through 33 where the means for measuring at the sampling rate a value representative of one or more processor circuitry performance parameters may include: means for measuring a value indicative of one or more processor cache circuitry usage parameters; where the one or more processor cache circuitry usage parameters include at least one of: one or more processor cache circuitry miss rate parameters; or one or more processor cache circuitry data write-back parameters.

Example 35 may include elements of any of examples 31 through 34 where the means for measuring at the sampling rate a value representative of one or more processor circuitry performance parameters may include: means for measuring a value indicative of one or more branch target buffer (BTB) circuitry performance parameters; where the one or more BTB circuitry performance parameters includes one or more BTB circuitry miss rate parameters.

Example 36 may include elements of any of examples 31 through 35 where the means for measuring at the sampling rate a value representative of one or more processor circuitry performance parameters may include: means for measuring a value indicative of one or more translation lookaside buffer (TLB) circuitry performance parameters; where the one or more TLB circuitry performance parameters include at least one of: one or more TLB circuitry miss rate parameters; or one or more TLB circuitry entry invalidation parameters.

Example 37 may include elements of any of examples 31 through 36 where the means for measuring at a sampling rate a value representative of a first system parameter may include: means for measuring at the sampling rate, by the performance management circuitry, a value representative of one or more performance management circuitry parameters; and where the one or more performance management circuitry parameters include a value indicative of one or more time stamp circuitry data read parameters.

According to example 38, there is provided a system to introduce controlled levels of uncertainty into one or more system parameters. The system may include: processor circuitry; performance management circuitry coupled to the processor circuitry; and a storage device coupled to the performance management circuitry, the storage device including machine-readable instructions that, when executed by the performance management circuitry, cause the performance management circuitry to: measure a value representative of a first system parameter in response to an attempt to access information indicative of the first system parameter; determine an interrupt threshold value for the measured value indicative the first system parameter; determine a frequency of change to the value indicative of a first system parameter; determine whether the frequency of attempts to access the one or more system parameters exceeds an access threshold value; determine a level of uncertainty to combine with the first system parameter; generate a second system parameter by combining the determined level of uncertainty with the measured value representative if the first system parameter responsive to a determination that the frequency of attempts to access the information indicative of the first system parameter exceeds the access threshold value; and generate a system interrupt responsive to a determination that the second system parameter exceeds the interrupt threshold value.

According to example 39, there is provided a system for adding uncertainty to one or more system values in response to a frequency of attempts to read the one or more system values, the system being arranged to perform the method of any of examples 9 through 15.

According to example 40, there is provided a chipset arranged to perform the method of any of examples 9 through 15.

According to example 41, there is provided at least one machine readable medium comprising a plurality of instructions that, in response to be being executed on a computing device, cause the computing device to carry out the method according to any of examples 9 through 15.

According to example 42, there is provided a device configured for adding uncertainty to one or more system values in response to a frequency of attempts to read the one or more system values, the device being arranged to perform the method of any of the examples 9 through 15.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:
1. A system, comprising:
processor circuitry;
performance management circuitry coupled to the processor circuitry; and
a storage device coupled to the performance management circuitry, the storage device including machine-readable instructions that, when executed by the performance management circuitry, cause the performance management circuitry to:
measure a value representative of a first system parameter in response to an attempt to access information indicative of the first system parameter;
determine a frequency of attempts to access the information indicative of the first system parameter;
determine whether the frequency of attempts to access the information indicative of the first system parameter exceeds a threshold value;

determine a level of uncertainty to combine with the first system parameter based on a counter value associated with the frequency of attempts to access the information indicative of the first system parameter; and generate an externally visible second system parameter by combining the determined level of uncertainty with the measured value representative of the first system parameter responsive to a determination that the frequency of attempts to access the information indicative of the first system parameter exceeds the threshold value.

2. The system of claim 1 wherein the instructions cause the performance management circuitry to determine the level of uncertainty proportional to the counter value associated with the frequency of attempts to access information indicative of the first system parameter.

3. The system of claim 1 wherein the first system parameter comprises one or more processor circuitry performance parameters.

4. The system of claim 3:
wherein the processor circuitry includes processor cache circuitry;
wherein the one or more processor circuitry performance parameters includes one or more processor cache circuitry usage parameters; and
wherein the one or more processor cache circuitry usage parameters include at least one of: one or more processor cache circuitry miss rate parameters; or one or more processor cache circuitry data write-back parameters.

5. The system of claim 3:
wherein the processor circuitry includes branch target buffer (BTB) circuitry;
wherein the one or more processor circuitry performance parameters includes one or more BTB circuitry performance parameters; and
wherein the one or more BTB circuitry performance parameters includes one or more BTB circuitry miss rate parameters.

6. The system of claim 3:
wherein the processor circuitry includes address translation lookaside buffer (TLB) circuitry;
wherein the one or more processor circuitry performance parameters includes one or more TLB circuitry performance parameters; and
wherein the one or more TLB circuitry performance parameters include at least one of: one or more TLB circuitry miss rate parameters; or one or more TLB circuitry entry invalidation parameters.

7. The system of claim 1 wherein the first system parameter comprises one or more performance management circuitry parameters.

8. The system of claim 7:
wherein the performance management circuitry includes time stamp circuitry; and
wherein the one or more performance management circuitry parameters include one or more time stamp circuitry parameters.

9. The system of claim 1, wherein the instructions cause the performance management circuitry to determine the level of uncertainty exponential to the counter value associated with the frequency of attempts to access information indicative of the first system parameter.

10. The system of claim 9, wherein the instructions cause the performance management circuitry to determine the level of uncertainty according to $e^{Counter}$ or Countern, where Counter refers to the counter value.

11. The system of claim 1, wherein the instructions cause the performance management circuitry to determine the level of uncertainty further based on a random value.

12. The system of claim 11, wherein the instructions cause the performance management circuitry to determine the level of uncertainty further based on a predefined bias value.

13. A method, comprising:
measuring a value representative of a first system parameter in response to an attempt to access information indicative of the first system parameter;
determining, by performance management circuitry, a frequency of attempts to access the information indicative of the first system parameter;
determining, by the performance management circuitry, whether the frequency of attempts to access the information indicative of the first system parameter exceeds a threshold value;
determining, by the performance management circuitry, a level of uncertainty to combine with the first system parameter based on a counter value associated with the frequency of attempts to access the information indicative of the first system parameter; and
generating, by the performance management circuitry, an externally visible second system parameter by combining the determined level of uncertainty with the measured value representative of the first system parameter responsive to a determination that the frequency of attempts to access the information indicative of the first system parameter exceeds the threshold value.

14. The method of claim 13 wherein determining a level of uncertainty to combine with the first system parameter comprises:
determining, by the performance management circuitry, a level of uncertainty proportional to the frequency of attempts to access information indicative of the first system parameter.

15. The method of claim 13 wherein measuring at a sampling rate a value representative of a first system parameter comprises:
measuring at the sampling rate, by the performance management circuitry, a value representative of one or more processor circuitry performance parameters.

16. The method of claim 15:
wherein measuring a value representative of one or more processor circuitry performance parameters comprises:
measuring, by the performance management circuitry, a value indicative of one or more processor cache circuitry usage parameters;
wherein the one or more processor cache circuitry usage parameters include at least one of: one or more processor cache circuitry miss rate parameters; or one or more processor cache circuitry data write-back parameters.

17. The method of claim 15:
wherein measuring a value representative of one or more processor circuitry performance parameters comprises:
measuring, by the performance management circuitry, a value indicative of one or more branch target buffer (BTB) circuitry performance parameters;
wherein the one or more BTB circuitry performance parameters includes one or more BTB circuitry miss rate parameters.

18. The method of claim 15:
wherein measuring a value representative of one or more processor circuitry performance parameters comprises:

measuring, by the performance management circuitry, a value indicative of one or more translation lookaside buffer (TLB) circuitry performance parameters;
    wherein the one or more TLB circuitry performance parameters include at least one of: one or more TLB circuitry miss rate parameters; or one or more TLB circuitry entry invalidation parameters.

19. The method of claim 13 wherein measuring a value representative of a first system parameter comprises:
    measuring, by the performance management circuitry, a value representative of one or more performance management circuitry parameters,
        wherein the one or more performance management circuitry parameters include a value indicative of one or more time stamp circuitry data read parameters.

20. A non-transitory storage medium that includes machine-readable instructions, that when executed by performance management circuitry causes the performance management circuitry to:
    measure a value representative of a first system parameter in response to an attempt to access information indicative of the first system parameter;
    determine a frequency of attempts to access the information indicative of the first system parameter;
    determine whether the frequency of attempts to access the information indicative of the first system parameter exceeds a threshold value;
    determine a level of uncertainty to combine with the first system parameter based on a counter value associated with the frequency of attempts to access the information indicative of the first system parameter; and
    generate an externally visible second system parameter by combining the determined level of uncertainty with the measured value representative of the first system parameter responsive to a determination that the frequency of attempts to access the information indicative of the first system parameter exceeds the threshold value.

21. The non-transitory storage medium of claim 20 wherein the machine-readable instructions that cause the performance monitoring circuitry to determine the level of uncertainty to combine with the first system parameter cause the performance monitoring circuitry to:
    determine a level of uncertainty proportional to the frequency of attempts to access information indicative of the first system parameter.

22. The non-transitory storage medium of claim 20 wherein the machine-readable instructions that cause the performance monitoring circuitry to measure the value representative of the first system parameter cause the performance monitoring circuitry to:
    measure a value representative of one or more processor circuitry performance parameters.

23. The non-transitory storage medium of claim 22 wherein the machine-readable instructions that cause the performance monitoring circuitry to measure the value representative of the one or more processor circuitry performance parameters cause the performance monitoring circuitry to:
    measure a value representative of one or more processor cache circuitry usage parameters;
        wherein the one or more processor cache circuitry usage parameters include at least one of: one or more processor cache circuitry miss rate parameters; or one or more processor cache circuitry data writeback parameters.

24. The non-transitory storage medium of claim 22 wherein the machine-readable instructions that cause the performance monitoring circuitry to measure the value representative of the one or more processor circuitry performance parameters cause the performance monitoring circuitry to:
    measure, at the sampling rate, a value representative of one or more branch target buffer (BTB) circuitry performance parameters;
        wherein the one or more BTB circuitry performance parameters includes one or more BTB circuitry miss rate parameters.

25. The non-transitory storage medium of claim 22 wherein the machine-readable instructions that cause the performance monitoring circuitry to measure the value representative of the one or more processor circuitry performance parameters cause the performance monitoring circuitry to:
    measure, at the sampling rate, a value representative of one or more translation lookaside buffer (TLB) circuitry performance parameters;
        wherein the one or more TLB circuitry performance parameters include at least one of: one or more TLB circuitry miss rate parameters; or one or more TLB circuitry entry invalidation parameters.

26. The non-transitory storage medium of claim 20 wherein the machine-readable instructions that cause the performance monitoring circuitry to measure the value representative of the first system parameter in response to the attempt to access information indicative of the first system parameter cause the performance monitoring circuitry to:
    measure a value representative of one or more performance management circuitry parameters;
        wherein the one or more performance management circuitry parameters include a value indicative of one or more time stamp circuitry data read parameters.

27. An electronic device, comprising:
    a printed circuit board;
    processor circuitry coupled to the printed circuit board;
    performance management circuitry coupled to the processor circuitry; and
    a storage device coupled to the performance management circuitry, the storage device including machine-readable instructions that, when executed by the performance management circuitry, cause the performance management circuitry to:
        measure a value representative of a first system parameter in response to an attempt to access information indicative of the first system parameter;
        determine a frequency of attempts to access information indicative of the first system parameter;
        determine whether the frequency of attempts to access the information indicative of the first system parameter exceeds a threshold value;
        determine a level of uncertainty to combine with the first system parameter based on a counter value associated with the frequency of attempts to access the information indicative of the first system parameter; and
        generate an externally visible second system parameter by combining the determined level of uncertainty with the measured value representative of the first system parameter responsive to a determination that the frequency of attempts to access the information indicative of the first system parameter exceeds the threshold value.

28. The electronic device of claim 27 wherein the instructions further cause the performance management circuitry to determine a level of uncertainty proportional to the frequency of attempts to access information indicative of the first system parameter.

29. A system, comprising:
- processor circuitry;
- performance management circuitry coupled to the processor circuitry; and
- a storage device coupled to the performance management circuitry, the storage device including machine-readable instructions that, when executed by the performance management circuitry, cause the performance management circuitry to:
  - measure a value representative of a first system parameter in response to an attempt to access information indicative of the first system parameter;
  - determine an interrupt threshold value for the measured value indicative of the first system parameter;
  - determine a frequency of change to the value indicative of a first system parameter;
  - determine whether a frequency of attempts to access information indicative of the first system parameter exceeds an access threshold value;
  - determine a level of uncertainty to combine with the first system parameter based on a counter value associated with the frequency of attempts to access the information indicative of the first system parameter;
  - generate a second system parameter by combining the determined level of uncertainty with the measured value representative of the first system parameter responsive to a determination that the frequency of attempts to access the information indicative of the first system parameter exceeds the access threshold value; and
  - cause a system interrupt responsive to a determination that the second system parameter exceeds the interrupt threshold value.

\* \* \* \* \*